Oct. 5, 1943.  F. L. DAWES ET AL  2,331,015
MOLDING PRESS
Filed June 7, 1940  2 Sheets-Sheet 1

INVENTORS
FORREST L. DAWES
EDGAR H. STRATTON
BY
ATTORNEYS

Oct. 5, 1943.　F. L. DAWES ET AL　2,331,015
MOLDING PRESS
Filed June 7, 1940　2 Sheets-Sheet 2
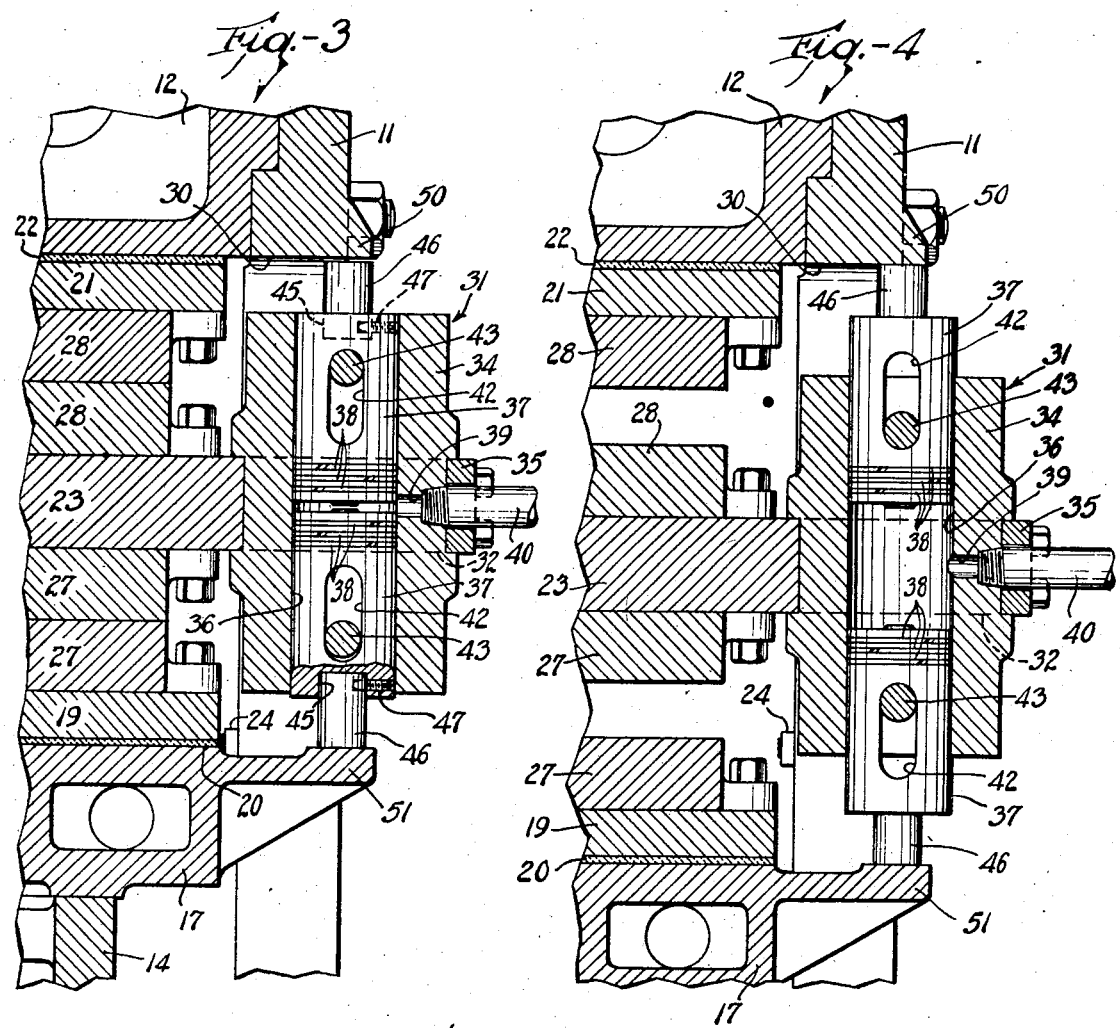
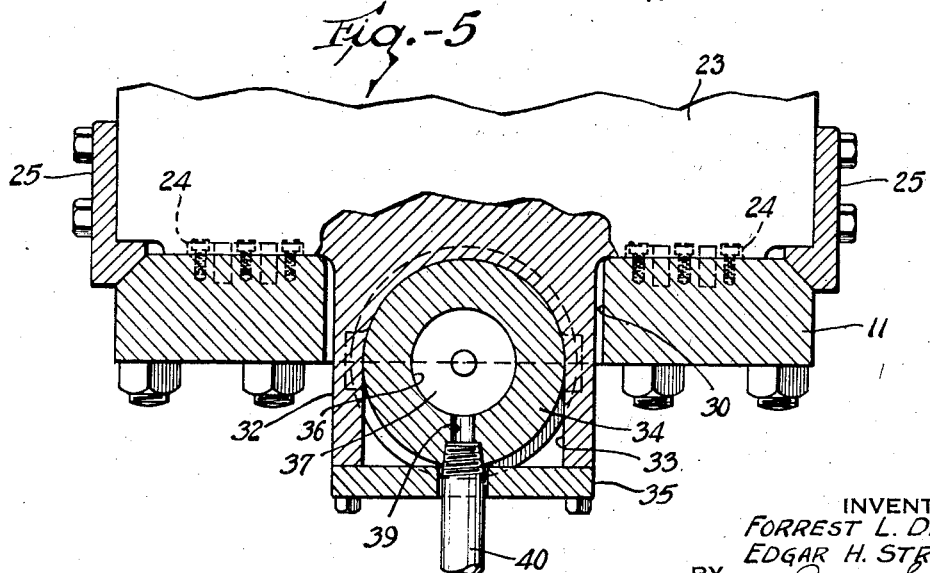
INVENTORS
FORREST L. DAWES
EDGAR H. STRATTON
BY
ATTORNEYS Patented Oct. 5, 1943

2,331,015

UNITED STATES PATENT OFFICE 2,331,015

MOLDING PRESS

Forrest L. Dawes, Kent, and Edgar H. Stratton, Cuyahoga Falls, Ohio, assignors to The Adamson Machine Company, Akron, Ohio, a corporation of Ohio Application June 7, 1940, Serial No. 339,334

6 Claims. (Cl. 18—16)

This invention relates to improvements in molding presses such as are used, for example, in the manufacture of thermo-plastic and heat-hardened goods, and more especially it relates to presses of the character mentioned having platens, including means for effecting positive separation of the platens during the opening of the press.

The invention is of especial utility in its application to presses such as are provided with an intermediate floating platen adapted to carry mold sections on its upper and lower faces, which mold sections are adapted to mate with complemental mold sections carried by a stationary upper platen secured to the upper head of the press, and a movable lower platen secured to the lower press head on the ram of the press. In such presses it frequently happens that the work being molded adheres to the mold sections with such tenacity as to retard separation thereof as the press ram is lowered, with the result that the intermediate platen or the lower platen does not descend with the ram. Thus the subsequent separation of the mold sections allows the said platens to drop, frequently with resulting damage to themselves or to other parts of the press. It is to the relief of this condition that this invention primarily is directed.

The chief objects of the invention are to provide in an improved manner for effecting the separation of the molds and platens in a molding press of the character mentioned; to obviate damage arising when molds do not separate as the press is opened; and to provide a single mechanism arranged to effect concurrent separation of two molds in a molding press employing an intermediate or floating platen. Other objects will be manifest as the description proceeds.

Of the accompanying drawings:

Figure 3 is a sectional detail, on a larger scale, of one of the pair of devices employed for separating the press molds, the press parts being shown in closed position;

Figure 4 is a view of the structure shown in Fig. 3, as it appears in operation, while the press is opening; and Figure 5 is a section, on a larger scale, on the line 5—5 of Fig. 2.

Figure 1:
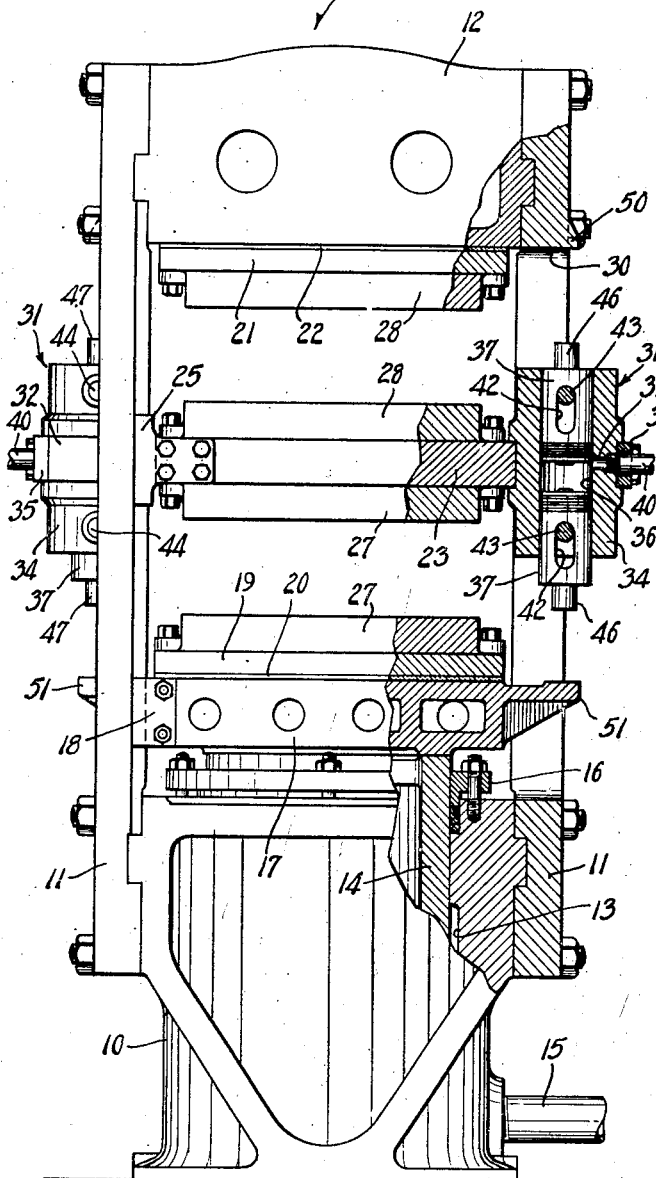
Figure 1 is a front elevation of a molding press embodying the invention, in the open position of the press, parts being broken away and in section.

Referring to the drawings, there is shown a hydraulically operated molding press comprising a base 10 to the opposite sides of which are secured upstanding strain plates 11, 11 that support an upper press head 12 at the top thereof. The base 10 is formed interiorly with a cylinder chamber 13 that has a vertical axis and which receives a ram 14, fluid for operating the latter being delivered to the cylinder and evacuated therefrom through a pipe 15 at the bottom thereof. The usual packing gland 16 surrounds the ram where it emerges from the cylinder 13. Resting upon the top of the ram 14 is the lower press head 17 that is provided at its four corners with guide plates, such as the guide plate 18, Fig. 1, that slidably engage respective corners of the strain plates 11 for preventing angular movement of the press head 17 relatively of the ram 14. The press head 17 carries a lower platen 19 that is separated from said head by a layer of thermal insulation 20 interposed therebetween. In like manner an upper press platen 21 is secured to the downwardly presented face of the upper press head 12 over an interposed layer of thermal insulation 22. Positioned intermediate the said upper and lower platens is a floating platen 23 which, in the open position of the press, rests upon narrow ledges or supporting plates 24, 24, Fig. 2, that are attached to the confronting faces of the strain plates 11. The four corners of the platen 23 are provided with respective guide plates 25 that slidably engage adjacent corners of the strain plates 11 to prevent angular movement of the platen. The platens 19, 21 and 23 are shown as solid plates, but they may be formed interiorly with passages for receiving hot or cold fluid if desired.

The press is equipped with two molds of which 27, 27 are mating sections of the lower mold secured to the lower platen 19 and intermediate platen 23 respectively, and 28, 28 are mating sections of the upper mold secured to the intermediate platen 23 and upper platen 21 respectively. Said platens may be of any suitable size and shape and are formed with the usual cavities (not shown) in which articles are molded. All of the foregoing structure is of well known construction and no novelty is claimed for it per se.

Each of the strain plates 11 is centrally formed with a vertical slot 30 extending substantially from the base 10 to the upper press head 12, and positioned in said slots are respective mold separating devices, designated as a whole by the numeral 31, which devices are carried by the intermediate platen 23 at opposite sides thereof. To this end said platen 23 is formed at each side with laterally extending projections 32 that extend through the respective slots 30 in the strain plates 11, said projections being recessed at 33 inwardly from the outer faces thereof to receive respective fluid pressure operated cylinders 34 that are disposed on vertical axes. The latter are circumferentially grooved midway between their ends so as to overlie the marginal portions of said recesses, and are secured in said recesses by respective retainer plates 35. Each cylinder 34 is formed interiorly with an axial chamber 36 that extends from end to end thereof and is of uniform diameter throughout, and mounted in said chamber are two pistons 37, 37, each of which is provided with suitable packing means, for example, a plurality of piston rings 38, 38 as shown, that prevent the passage of fluid between the pistons and the chamber wall. The pistons 37 are adapted to be projected outwardly by pressure fluid, preferably hydraulic, that is discharged into chamber 36 through a central port 39, said port being connected to an inlet and outlet pipe 40. The latter may be a flexible hose, but preferably it has a swingable extensible connection with a suitable source of pressure fluid (not shown).

The pistons 37 have limited axial movement in their cylinders 34, and to this end each piston is formed with a diametric slot 42 that extends longitudinally thereof. Extending through each of said slots 42 is a stud or pin 43 that has its end portions located in a diametric bore in the cylinder 34, the respective ends of said bore being closed by plugs 44, Fig. 2, threaded thereinto. The outer end of each piston 37 is formed with a shallow axial recess 45 in which is mounted a projecting wear-pin 46 that is retained in said bore by a set screw 47, Fig. 3. The arrangement makes the wear-pin readily replaceable if it should become chipped or broken during use, and obviates the necessity of replacing the entire piston. Furthermore, wear-pins of different lengths may be provided so that the mold separating devices will function normally notwithstanding molds of various thicknesses that may be employed with the press.

The pistons 37 of each cylinder 34 are arranged to operate against a strain plate 11 and the lower press head 17 respectively. To this end each strain plate is formed, at the top of its slot 30, with an integral outwardly projecting lug 50 that extends across the projected axis of a cylinder 34, above the same. Also the lower press head 17 as shown is integrally formed, on opposite sides thereof, with laterally extending brackets 51 that project through the slots 30 of the respective strain plates 11 and extend across the projected axis of the respective cylinders 34, below the same. If desired, the brackets 51 may be separate elements that are bolted or otherwise secured to the press head.

Figure 2:
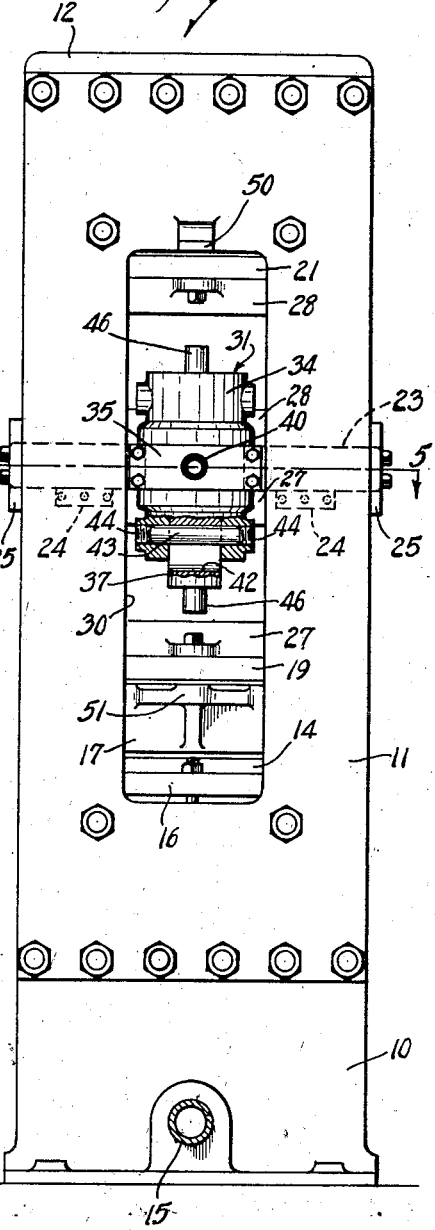
Figure 2 is a side elevation of the press in the open position thereof shown in Fig. 1.

The operation of the improved press is as follows. Normally there is no fluid pressure in the cylinders 34, and when the press is open, as shown in Figs. 1 and 2, for mold loading and unloading purposes, the pistons 37 of the mold separating devices are in the positions shown in said figures. In the closing of the press, the cylinder 13 is charged to lift the ram 14 and with it the lower press head 17, lower platen 19, and lower mold section 27. As the press head 17 rises the brackets 51 thereof engage the lower pistons 37 of the mold separating devices and move them upwardly in the cylinders 34, but before the lower ends of the piston slots 42 meet their cross-pins 43, the lower mold section 27 meets its mating section 27 to close the mold, whereupon rising movement of the intermediate or floating platen 23 begins, which platen lifts with it the cylinders 34. The platen 23 continues to rise until the mold sections 28 move into mating relation, which position of the various parts of the press is shown in Fig. 3. It will be noted that in the closed position of the press, the upper pistons 37 are supported on their pins 43, but that the wear-pins 46 of the upper pistons are not in contact with the lugs 50 on the strain plates 11, so that said pins 43 are required to support only the weight of the pistons, and no other strain is imposed on them. The press remains in closed position until the work in the molds 27 and 28 is fully molded, and subjected to heating or cooling if the molding process includes such treatment.

Thereafter, the press is opened, this being effected by evacuating or discharging of the pressure fluid in the ram cylinder 13. Concurrently with the discharging of the cylinder 13, the cylinders 34 of the mold separating devices are charged, with the result that the pistons 37 thereof are projected outwardly in opposite directions, the upper pistons exerting pressure against the lugs 50 of the strain plates to assure separation of the upper mold sections 28 and consequent descent of the floating platen 23, and the lower pistons 37 exerting pressure against the lower press head 17, through the agency of its brackets 50, to assure separation of the lower mold sections 27 and consequent descent of the said lower press head with the ram. The arrangement is such as to initiate the separation of the three platens, and to support the intermediate platen midway between the upper and lower platens until the pistons 37 of the cylinders are fully projected. The floating platen continues to descend until it comes to rest upon the supporting plates 24, the lower platen continuing to descend until the ram 14 reaches the bottom of its stroke, which is the position shown in Figs. 1 and 2. It will be clearly evident from said figures that the pistons 37 are out of contact with the lugs 50 and brackets 51 well before the floating platen reaches its supporting plates 24 and before the lower platen reaches its fully lowered position, the arrangement being such that the pistons 37 impose no strain upon the lugs 50 or upon the brackets 51 after the floating platen has traversed but a part of its descending course, and at no time impose any strain upon the supporting plates 24. The cylinders 34 may then be evacuated. This completes a cycle of operation which may be repeated as desired.

In an alternative method of operation, the cylinders 34 are charged at all times, usually from the same source that supplies fluid to the cylinder 13, but in the closing of the press, because of the greater area of the ram 14, the pistons 37 are forced into their cylinders 34, against the pressure of the fluid therein, said fluid being forced back into the supply line. Thus upon evacuation of the cylinder 13, the pressure in cylinders 34 automatically functions to effect separation of the mold sections in the press as described.

The invention is relatively simple in construction, its cost of construction and operation is low, it assures positively the separation of the molds in the press as the latter opens, and it achieves the other objects set out in the foregoing statement of objects.

Modification may be resorted to without departing from the spirit of the invention, or the scope thereof as defined by the appended claims.

What is claimed is:

1. A molding press of the character described comprising opposed platens, means for moving said platens toward each other to close the press, and a fluid pressure cylinder disposed between said platens, including a pair of pistons in said cylinder so positioned as to be movable in opposite directions into operative engagement with said platens to initiate separation of the platens during the opening of the press, the cylinder and pistons being so constructed that the combined movement of the pistons is less than the extent of separation of the platens whereby the latter are separated from the pistons when the press is fully open.

2. A molding press of the character described comprising a plurality of platens including an intermediate platen, means for moving said platens toward each other to close the press, and a fluid pressure cylinder mounted upon an intermediate platen including a pair of pistons in said cylinder adapted to be projected in opposite directions into engagement with respective platens above and below said intermediate platen to initiate separation of the platens during the opening of the press, the movement of the pistons in the cylinder being less than the extent of separation of the platens when the press is fully open whereby the platens are out of engagement with said pistons.

3. A molding press of the character described comprising a stationary head, a head movable toward said stationary head to close the press, a floating platen disposed intermediate said heads, and a fluid pressure cylinder carried solely by said platen including a pair of opposed pistons in said cylinder in position to engage a stationary structure and said movable head respectively after the press is closed and prior to the opening thereof to initiate separation of the said heads from said platen during the opening of the press, said pistons being of such length as to stand in spaced relation to said heads when the press is fully open.

4. A molding press of the character described comprising a plurality of platens including a platen intermediate two platens, means for moving said platens toward each other to close the press, and a fluid pressure cylinder mounted solely upon the intermediate platen for initiating separation of the platens during the opening of the press, said cylinder comprising an axial chamber, a pair of pistons projecting from opposite ends of said chamber in position to engage the platens at opposite sides of the intermediate platen, and means limiting the axial movement of said pistons in both directions to a distance that is less than the distance between adjacent platens in the fully open position of the press.

5. A combination as defined in claim 4 in which the means for limiting the axial movement of the pistons consists of pins secured in the cylinder and extending through diametric slots in the pistons.

6. A combination as defined in claim 4 including renewable wear-pins in the outer ends of the respective pistons.

FORREST L. DAWES.
EDGAR H. STRATTON.